UNITED STATES PATENT OFFICE.

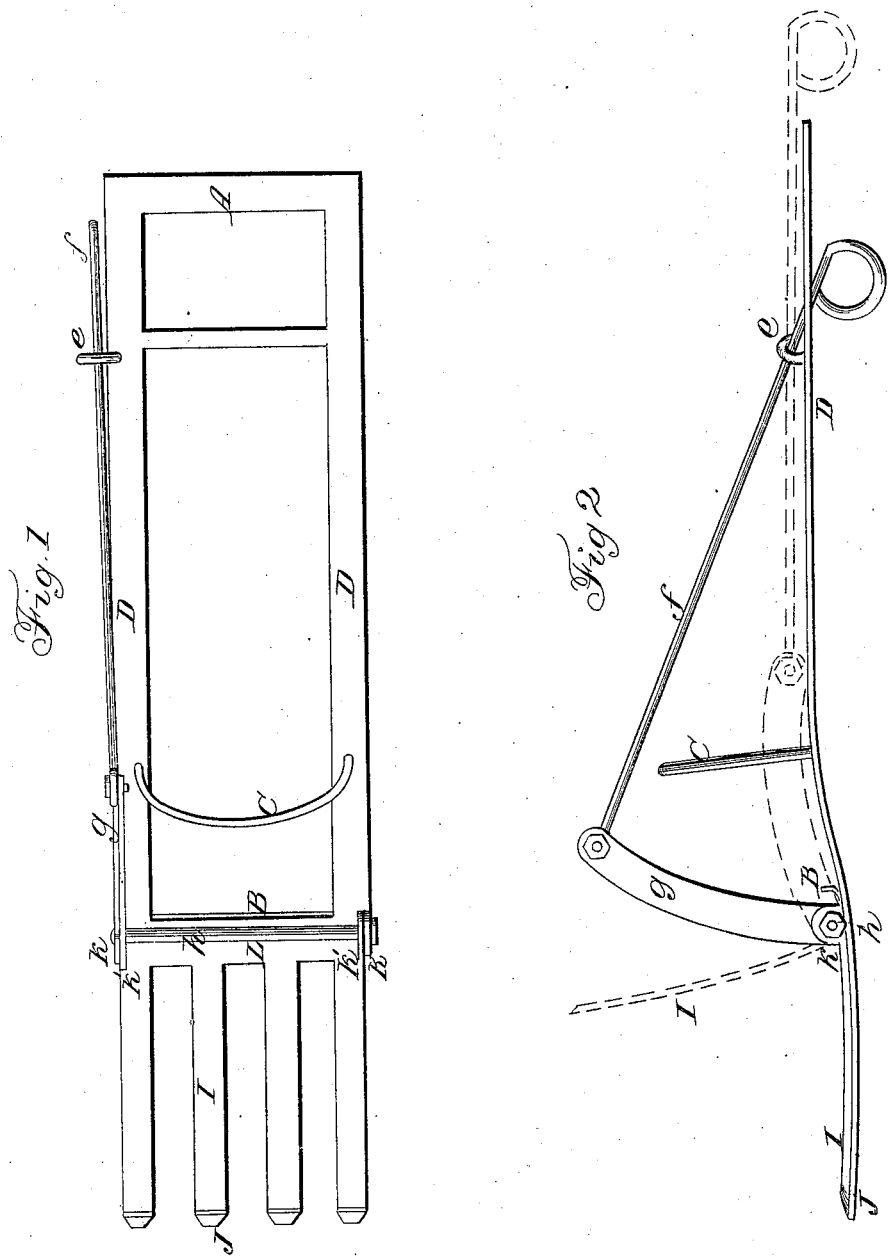

L. DUVALL, OF BIG SPRING, KENTUCKY.

IMPROVEMENT IN COMBINED SPADE AND FORK.

Specification forming part of Letters Patent No. 53,127, dated March 13, 1866.

*To all whom it may concern:*

Be it known that I, L. DUVALL, of Big Spring, in the county of Breckenridge and State of Kentucky, have invented a new and useful Improvement in Combined Spades and Forks; and I do hereby declare that the following is a full, clear, and exact description thereof, which will enable others skilled in the art to make and use the same, reference being had to the accompanying drawings, forming part of this specification, in which—

Figure 1 is a plan view of a spade made according to my invention, the implement being represented as laid down on its back. Fig. 2 is a side view.

The object of this invention is to relieve labor of a part of its toil in the work of spading the ground; and it consists in forming the blade of a spade of two series of tines, placed one over the other, the upper series being hinged at the top of the blade and being operated by the laborer through a rod which extends up to the handle, the implement being so made in other respects as to combine the qualities of a dung-fork also.

In this example of my invention I have made most of the parts of the spade out of sheet metal; but in practice it will be better to use steel for the blades or tines, and wood, or wood and metal combined, for the handle and shank. The form of the handle and shank may be varied to suit the manufacturer.

A is the handle. It is connected to the lower part of the spade by two side pieces, D D, whose lower ends are connected to the blade or tines J.

The blade or cutting part of the spade is, in this example, composed of two series of narrow tines, each series containing four tines. The letter J designates the lower series, which are rigidly connected to the shanks D, and upon these are placed the upper series, I, the tines of each series agreeing with the other in width and position, so that when together they exactly coincide. The tines J are connected above by a cross-piece, B, which also connects the lower ends of the shanks D D. The cross-piece B is made heavy, and it is also strengthened by bending over a portion of its upper edge, or in any other suitable way, so that the operator can place his foot thereon when driving the spade into the ground.

Ears K K, formed on the opposite edges of the cross-piece, are turned up at right angles thereto, and like ears K' K' are formed on the cross-piece L, which connects the upper ends of tines I. Through these ears a rod, $h$, is passed, and both its ends secured thereto by nuts or otherwise.

From one of the ears K' of the upper tines extends a curved arm, $g$, to whose end is pivoted a rod, $f$, that passes through an eye, $e$, made on the side of one of the shanks D. The upper end of the rod has a loop formed on it, so that it may be readily seized by the hand.

C is a bail extending in front of the handles and reaching from one to the other of them in a horizontal direction.

The manner of operating the spade is as follows: In using it one forces its tines into the ground with the foot, holding it at the handle with both hands. The handle is then pushed forward, so as to crowd the ground in that direction and to loosen the upper part of the spade, after which it is brought back again. The loop of the rod $f$ is next seized and the rod drawn outward, thereby raising the upper series of tines, I, and casting up the dirt, which is thereby stirred and broken or pulverized ready for planting or sowing.

It will be observed that the use of this implement will save the gardener from the weary task of bending down to lift the earth each time he drives his spade into the ground.

When the implement is to be used for a dung-fork or for pitching anything which can be seized by its tines, the laborer removes the upper tines, I, and rod $f$ by unscrewing the nut which fastens the rod $h$. Then, by taking hold of the bail C with the left hand and the handle A with the right, it will be found in readiness for such use.

I do not claim, broadly, hinging the blade to the handle and giving it a vibratory adjustment thereupon; but

What I claim is—

The arrangement of the tines permanently attached to a suitable handle, and the removable and vibratory tines hinged thereto and operated by the arm $g$ and rod $f$ or their equivalents, substantially as and for the purpose described.

L. DUVALL.

Witnesses:
B. J. BLISSIT,
BEN ELDER.